Sept. 22, 1931.　　　　R. F. KOHR　　　　1,824,725
BRAKE OPERATING MECHANISM
Filed June 10, 1929　　2 Sheets-Sheet 1
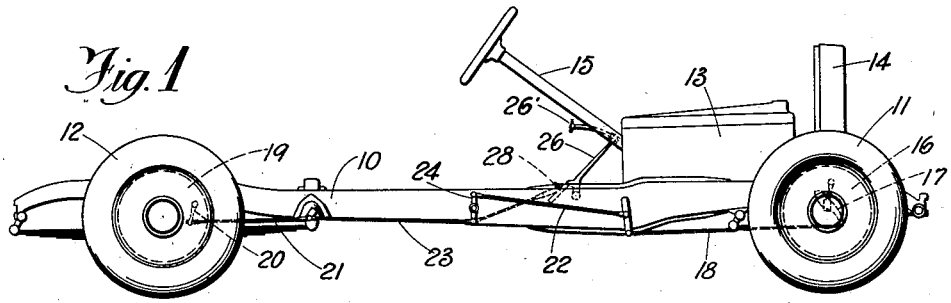
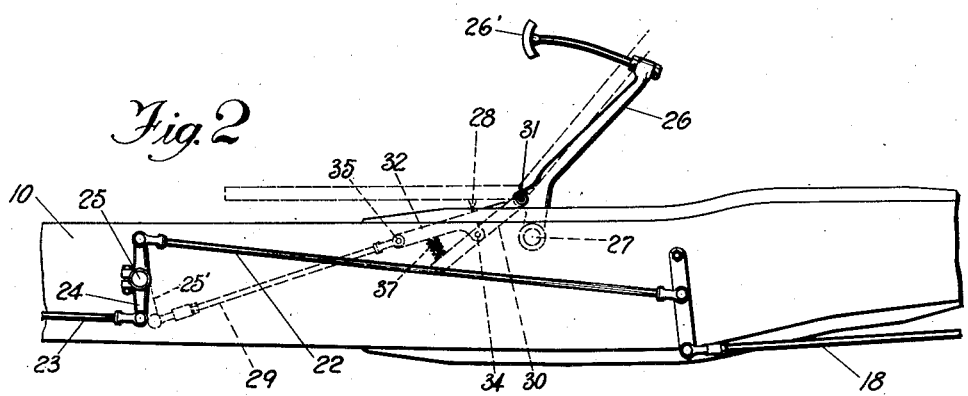
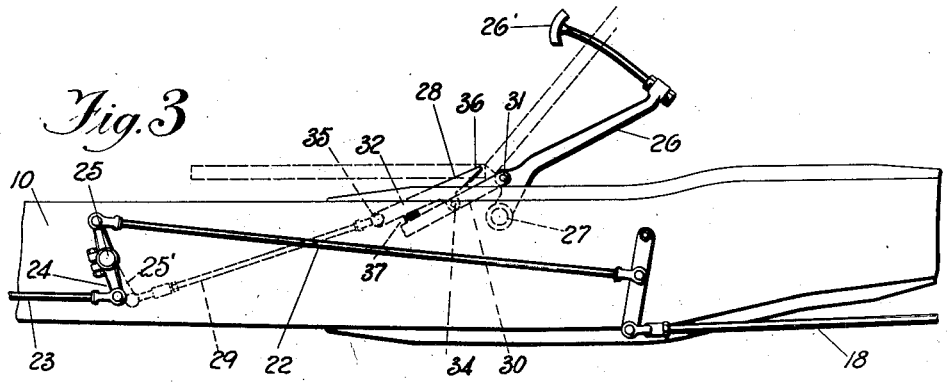
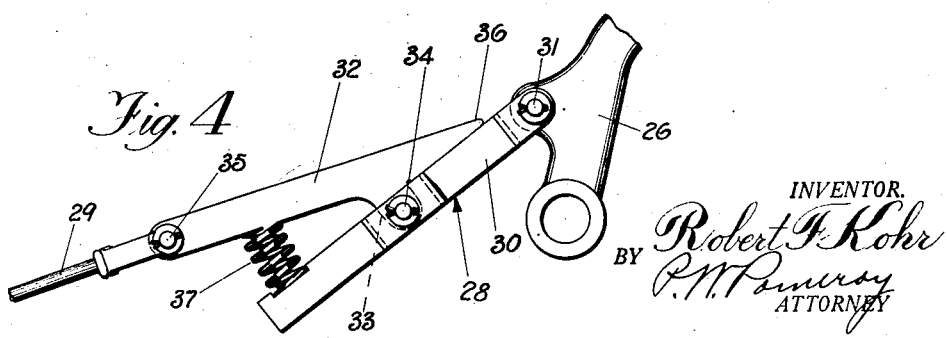
INVENTOR.
Robert F. Kohr
BY P. W. Pomeroy
ATTORNEY

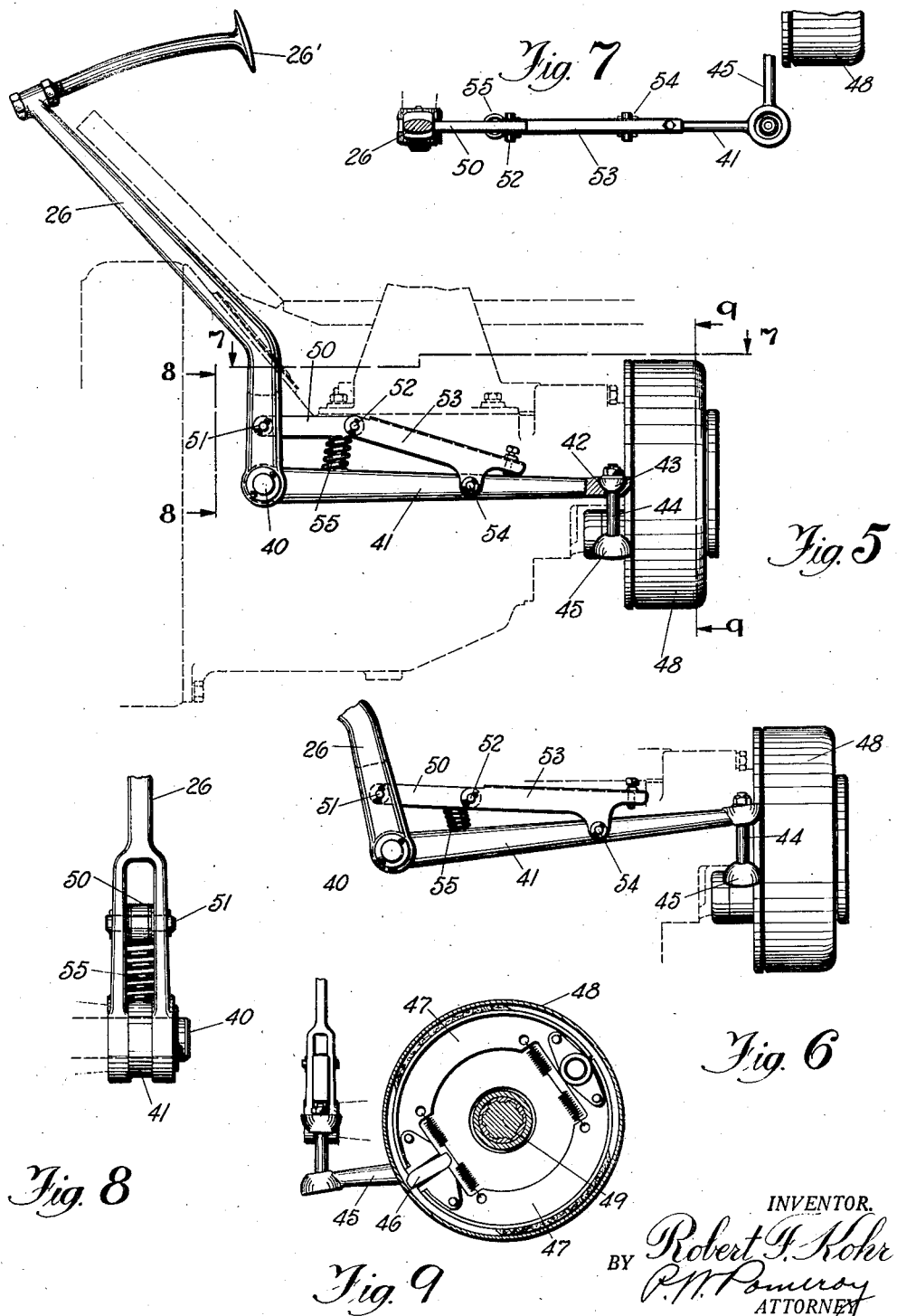

Patented Sept. 22, 1931

1,824,725

UNITED STATES PATENT OFFICE

ROBERT F. KOHR, OF SOUTH BEND, INDIANA, ASSIGNOR TO THE STUDEBAKER CORPORATION, OF SOUTH BEND, INDIANA, A CORPORATION OF NEW JERSEY

BRAKE OPERATING MECHANISM

Application filed June 10, 1929. Serial No. 369,759.

This invention relates to brake operating mechanisms and particularly to a modulator in the connection between the brake operating member and the brake to be operated thereby.

One of the objects of the invention is to provide a connecting device between the brake pedal and brake cam or other brake applying means which has included therein a yielding means continuously and smoothly variable, without points of inflection, from a light spring connection toward a rigid connection within the operating range of pedal pressure and travel necessary for proper control of the vehicle.

A further object is to provide a connecting device between the brake pedal and brakes to be operated thereby which has included therein a link mechanism adapted to permit relative movement between the pedal and brake so that the operator can better determine the degree of braking force desired.

The above and other objects relating to certain features of construction and combination of parts to be hereinafter described with reference to the accompanying drawings, and then claimed, will be apparent from the detailed description to follow.

In the drawings which illustrate suitable embodiments of my present invention,

Figure 1 is a diagrammatic side elevation of a vehicle chassis showing the brake operating means therefor.

Figure 2 is an enlarged fragmentary side elevation showing the foot pedal and the brake applying rods operatively connected therewith, the brake applying mechanism being shown in inoperative position.

Figure 3 is a view similar to Figure 2, showing the brake operating mechanism in brake applying position.

Figure 4 is an enlarged side elevation of the modulator.

Figure 5 is a side elevation of a brake mounted on a transmission connected with the brake applying foot pedal and including a modified form of the modulator.

Figure 6 is a fragmentary side elevation similar to Figure 5, showing the brake applying mechanism in operative position.

Figure 7 is a section taken on the line 7—7 of Figure 5.

Figure 8 is an end elevation of the brake pedal and parts connected therewith taken looking in the direction of the arrows 8—8 on Figure 5.

Figure 9 is a section taken on the line 9—9 of Figure 5 showing a transmission brake and operating means therefor.

Particularly in mechanical servo brake mechanisms, difficulties have been encountered in applying the brakes due to the fact that very little pressure was required to move the brake pedal a limited amount when starting to apply the brakes and as the pedal was further depressed the operator encountered a sudden and sharp resistance to the pedal movement. During the initial movement of the brake pedal little manual effort was required, the pedal moving comparatively easy until the brake shoes engaged with the brake drum. At this point there was a considerable change in the pedal pressure required and considerable effort was needed to depress the pedal still further to complete the applying of the brake shoes with the brake drum to stop the vehicle.

Having the above and other difficulties in mind, I have included a modulator in the connection between the brake pedal and the brakes to be applied thereby so as to provide a yielding means variable continuously and smoothly from a light spring connection toward a wholly rigid connection within the operating range of pedal pressure and travel. During the pedal travel in the operation of the brakes a sharp change in pedal pressure is avoided and it is also obvious that a rigid connection is never reached because it is impossible to apply infinite pressure to the pedal. Although a brake operating mechanism including my modulator permits of and necessitates a greater brake pedal travel than in the conventional constructions this new improvement in the application of brakes has been found to have great advantages and utility especially when used in connection with mechanical servo brake mechanisms because of the smoother operation of the brake applying means.

In the accompanying drawings in which like numerals refer to like parts throughout the several views, and referring particularly to Figures 1 to 4 inclusive, I have shown a vehicle chassis comprising a frame 10, front and rear wheels 11 and 12, an engine 13, radiator 14 and a steering mechanism 15. Each front wheel 14 is provided with a brake 16 connected by a suitable bell crank lever 17 to a brake rod 18. Each rear wheel 12 has a brake 19 mounted therein connected by a suitable lever 20 to a brake rod 21. The brake rods 18 and 21 are connected by any suitable means with operating rods 22 and 23 connected at their adjacent ends to a double armed lever 24 mounted on a cross shaft 25 supported in suitable bearings on the chassis frame 10. A brake pedal arm 26 having a brake pedal 26' thereon is pivotally supported at 27 on the vehicle chassis and pivotally supports a modulator 28 to be hereinafter more fully described, the same being pivotally connected with a rod 29 which is operatively connected with the cross shaft 25 by the arm 25'. It will thus be seen that when the foot pedal 26' is depressed that the rod 29 will be operated to rock the double armed lever 24 mounted on the shaft 25 to thus operate the brake operating rods 22 and 23 to operate the brakes 16 and 19 through the brake rods 18 and 21.

The modulator 28 comprises a member 30 pivotally connected at 31 to the brake pedal arm 26, and a second member 32 having a depending portion 33 pivotally connected at 34 to the member 30 intermediate the ends thereof. The member 32 is pivotally connected at 35 to the brake rod 29. The member 32 is provided with an extending portion 36 which normally seats against the upper face of the member 30 and is held in that position by means of the spring 37 interposed between the free ends of the member 30 and the member 32 as is clearly shown in Figure 4.

In normal inoperative position the members 30 and 32 are held in the position as shown in Figure 4 but when the brake pedal 26 is depressed to operate the brakes the extension 36 on the member 32 will tend to pull away from the member 30 and compression of the spring 37 will increase as further pressure is applied to the brake pedal 26'. When first applying pressure to the brake pedal 26' there is a light spring connection between the brake pedal 26' and the brake rod 29 but as further pressure is applied thereto the spring 37 will be further compressed as the pivots 31, 34 and 35 tend to move into a straight line. It is preferable that the size and design of the spring 37 be such that it is never fully compressed between the members 30 and 32 when the brakes are fully applied so that at all times there is a spring connection between the brake pedal 26' and the brakes to be operated thereby.

It will thus be seen from Figures 1 to 4 inclusive and the description thereof, that at the beginning of the pedal travel there is a light spring connection between the brake pedal 26' and the brake rod 29 and that yielding means is provided which varies continuously without any points of inflection so that during the travel of the pedal 26' the yielding means has progressively added resistance thereto to permit a smooth operating range of pedal pressure and travel desirable for easy performance and smooth brake operation.

Referring particularly to Figures 5 to 9 inclusive of the drawings which show a modified form of brake construction and a modulator adaptation therefor, I have shown a brake operating pedal 26' attached to a pedal arm 26 pivotally connected at 40 to the arm 41 having a socket 42 formed in the free end thereof to receive the ball 43 on a link 44 having a suitable connection at its opposite end to be received in an arm 45 operatively connected with a cam 46 for expanding the brake shoes 47 to engage with a brake drum 48 operatively connected with a transmission shaft 49 driven by any suitable power operating means such as the engine 13 shown in Figure 1. In this modified construction the brake arm 26 is preferably forked to straddle the arm 41 and to receive the pivot 40 therein.

The modulating device comprises a link 50 pivotally connected at 51 to the brake arm 26 at one end thereof and pivoted at its opposite end at 52 to a link 53 which is pivotally connected intermediate its ends at 54 to the brake operating arm 41. A spring 55 is preferably positioned between the brake operating arm 41 and the link 50 as is clearly shown in Figures 5 and 6. As the brake pedal 26' is depressed the links 50 and 53 will tend to move in a manner so that their longitudinal axes coincide and to compress the spring 55 between the brake operating arm 41 and the link 50.

The operation of the modulator just described is the same as the device shown in detail in Figure 4, the same being an adaptation for a brake operating mechanism mounted in a different manner but operating to give the same result and to rectify the faults heretofore encountered in brake applying mechanisms especially for mechanical servo brakes.

Although the foregoing description is necessarily of a detailed character in order that the invention may be clearly set forth, it is to be understood that the specific terminology is not intended to be restrictive or confining and that various re-arrangements of parts and modifications of structural details may be resorted to without departing from the scope or spirit of the invention as herein defined.

What I claim is:

1. A brake operating mechanism comprising, a manually operated brake applying member, linkage operatively connected with said brake, and a modulator comprising a pair of pivoted members interposed between said brake applying member and linkage, one of said members being pivotally connected to said brake applying member and the other member being pivotally connected to said linkage to provide a limited relative movement over an infinite range of pedal pressure requiring a progressively greater increment of pedal pressure for each equal increment of relative movement between said applying member and linkage.

2. A brake operating mechanism comprising, a manually operated brake applying member, linkage operatively connected with said brake, and a spring controlled modulator comprising a pair of links interposed between said brake applying member and linkage to provide a limited relative movement over an infinite range of pedal pressure requiring a progressively greater increment of pedal pressure for each equal increment of relative movement between said applying member and linkage.

3. A brake operating mechanism comprising, a manually operated brake applying member, linkage operatively connected with said brake, and a modulator interposed between said brake applying member and linkage, said modulator comprising a member pivotally connected with said brake applying member, a member pivotally connected with said linkage, a pivoted connection between said members, and spring means interposed between said members.

4. A brake operating mechanism comprising, a manually operated brake applying member, linkage operatively connected with said brake, and a modulator interposed between said brake applying member and linkage, said modulator comprising a member pivotally connected with said brake applying member, a member pivotally connected with said linkage, a pivoted connection between said members, and spring means contacting with at least one of said members to permit variable pressure on said brake applying member from a light spring connection toward a rigid connection.

5. A brake operating mechanism comprising, a manually operated brake applying member, linkage operatively connected with said brake, and a modulator interposed between said brake applying member and linkage, said modulator comprising a member pivotally connected with said brake applying member, a member pivotally connected with said linkage, a pivotal connection between said members, and spring means interposed between said members normally urging said members into contact with each other and permitting said members to be separated when pressure is applied to said brake applying member.

6. In a brake operating mechanism, a modulator interposed between the brake applying member and the linkage operatively connected with the brake to be operated thereby, said modulator comprising two members each respectively pivotally connected with said brake applying means and said linkage and pivotally connected together and spring means contacting with at least one of said members to vary the manual effort applied to said brake applying member to progressively vary the pedal pressure.

7. In a brake operating mechanism, a manually operated brake applying member, brake applying means operatively connected with said brake, and a modulator interposed between said brake applying member and brake applying means, said modulator comprising members respectively pivoted to said brake applying member and brake applying means and pivotally connected together, said pivots tending to move in a straight line upon operation of said brake applying member to permit a limited relative movement over an infinite range of pedal pressure requiring a progressively greater increment of pedal pressure for each equal increment of relative movement between said brake applying member and brake applying means.

8. A brake operating mechanism comprising, a manually operated brake applying member, linkage operatively connected with said brake, and a modulator interposed between said brake applying member and linkage, said modulator comprising a pair of pivoted members having their longitudinal axes normally at an angle to each other and having said axes movable toward parallel relationship when said brake applying member is operated to apply said brake.

9. In a brake operating mechanism, a modulator interposed between the brake applying member and the brake to be operated thereby, said modulator comprising members pivotally connected together, and spring means contacting with at least one of said members to vary the manual effort applied to said brake applying member during the movement of same to apply said brake.

10. In a brake operating mechanism, a modulator interposed between the brake applying member and the brake to be operated thereby, said modulator comprising members pivotally connected together having their longitudinal axes normally intersecting each other and movable by said brake applying member toward parallel relationship upon actuation of said member to apply said brake.

Signed by me at South Bend, Indiana, this 6th day of June, 1929.

ROBERT F. KOHR.